UNITED STATES PATENT OFFICE.

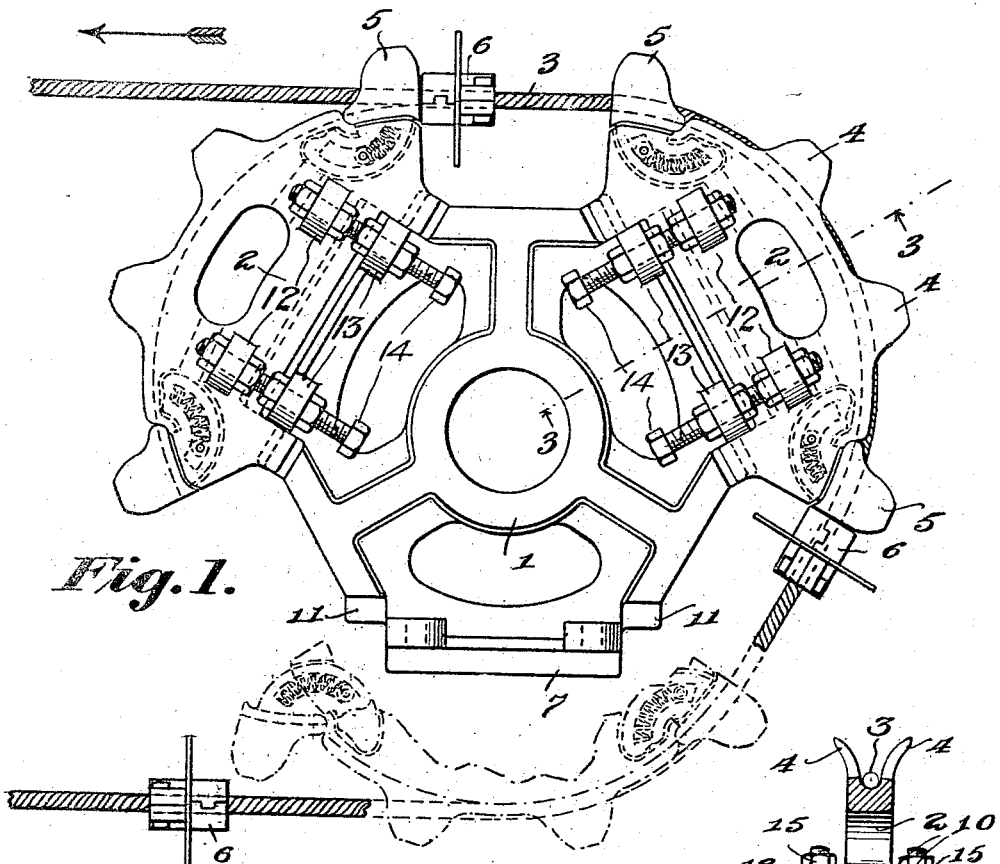
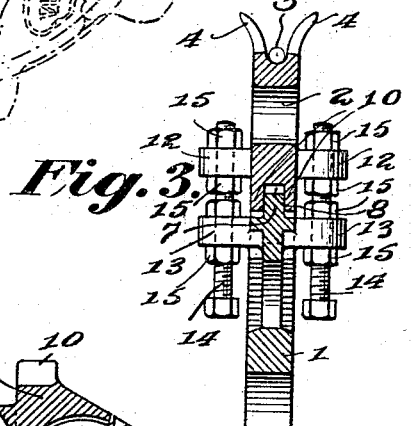
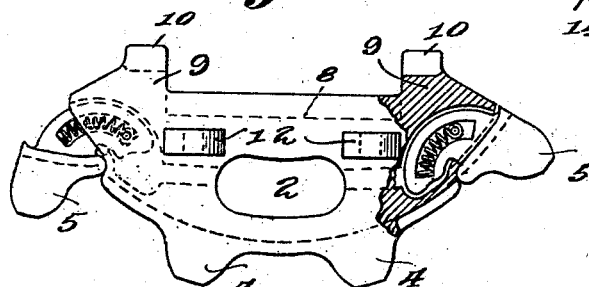

CHARLES M. SNIDER, OF COLUMBUS, OHIO, ASSIGNOR TO THE JEFFREY MANUFACTURING COMPANY, OF COLUMBUS, OHIO, A CORPORATION OF OHIO.

SPROCKET-WHEEL.

1,244,383.

Specification of Letters Patent.

Patented Oct. 23, 1917.

Application filed September 26, 1913. Serial No. 792,002.

*To all whom it may concern:*

Be it known that I, CHARLES M. SNIDER, a citizen of the United States, residing at Columbus, in the county of Franklin and State of Ohio, have invented certain new and useful Improvements in Sprocket-Wheels, of which the following is a specification, reference being had therein to the accompanying drawing.

This invention relates to sprocket wheels of the type disclosed in the patents of William W. Willson, Nos. 649,563, 948,385 and 994,896.

The object of the present invention is to provide for cable conveyers, or cable power transmitters, a wheel adapted to positively engage with the cable attachments but which will be superior to the earlier wheels of this class. It consists in providing a wheel which can be of a large diameter and yet can be constructed with much less metal than has been used heretofore; which will have fewer teeth for guiding and engaging with the cable; which will permit the cable to flex freely as it passes around the wheel without danger of the transverse breakage well known to be incident to these cable structures at points near the ends of the sprocket gaps that are formed in the wheel periphery; which will have the cable guide teeth formed on rim sections each section extending rigidly from end to end and adapted to co-act with rigid guides on the hub section; together with novel means for adjusting the tooth carrying sections outward and inward and means for fastening them rigidly in position after adjustment.

Of the accompanying drawings, which illustrate one embodiment of the invention,—

Figure 1 is a side elevation of a sprocket wheel with one of the tooth-carrying sections detached.

Fig. 2 is a side elevation of the tooth-carrying section which is detached from the wheel shown in Fig. 1.

Fig. 3 is a fragmentary sectional view taken along the line 3—3 of Fig. 1.

Referring to the drawings, 1 represents the main central or hub portion of the wheel which is centrally apertured and adapted to be mounted on a suitable shaft which is not shown. Mounted upon this main central section are several segmental tooth-carrying sections 2, 2, three such sections being shown in the present instance. Each of the sections 2, 2, is provided with a peripheral groove adapted for the reception of a rope or cable 3 and with guide teeth 4, 4, adapted to coöperate with the groove to hold the cable in place.

The peripheral curvature of each section 2 is preferably formed with a radius considerably less than the radius of the wheel as a whole. It is necessary to provide gaps between each section and the next to receive the sprocket blocks on the cable and, when the cable is fitted with conveyer flights, the gaps must be rather long to accommodate said flights. The cable will necessarily lie straight across the gaps. If the peripheries of the sections were formed with the center of the wheel as the center of curvature, the cable would necessarily be sharply bent at the end of each section with resulting wear and deterioration. By forming the sections with smaller radii, as shown, each straight section of the cable is tangent to each adjacent curved section, with the result that the cable is not subjected to any sharp bending.

At the end of each of the sections 2 there is provided a pivoted tooth 5 of the sort shown and described in the several patents above referred to. As the construction and operation of sprocket wheels having teeth of this sort are now well known and understood, it will not be necessary to enter into a detailed description. It is sufficient to point out that the teeth are pivoted in order that they may be enabled at each revolution to travel for a short distance in a straight line under the influence of one of the sprocket blocks 6 secured to the cable, instead of following its normal curved path. In this way the wear between the teeth and the sprocket blocks is greatly reduced.

The hub section 1 of the wheel is provided with a plurality of tongues 7 corresponding in number to the number of tooth-carrying sections 2. Each section 2 is provided with a groove 8 adapted to receive one of the tongues. The ends of the groove 8 are closed and are adapted to engage the ends of the corresponding tongue. Preferably, though not necessarily, each section 2 is also provided at each end of the groove 8 with an inward projecting boss 9 having two separated lugs 10, 10. The section 1 is notched to receive the bosses 9, 9, and is provided with tongues 11, 11, to enter the spaces between the lugs 10, 10. It will be seen that when the tooth-carrying section is in place on the hub section the interengagement of the parts above described will rigidly hold the two sections against relative movement circumferentially or in directions parallel to the wheel axis. The tooth-carrying section is, however, freely movable radially.

For adjusting each tooth-carrying section radially and for holding it in adjusted position, I provide the apertured bosses 12, 12 on the section 2, and the apertured bosses 13, 13 on the section 1. Through these bosses there extend the bolts 14, 14, each of which is provided with four nuts, one on each side of each boss. It will be readily seen that by properly adjusting these several nuts on the bolts the tooth-carrying section can be moved outward or inward and again, after adjustment, be rigidly secured in position. This radial adjustment of the tooth-carrying sections is essential in order to make the pitch of the wheel the same as the pitch of the sprocket blocks on the cable. During use the cable will stretch and the pitch of the blocks will be changed. In order for the most efficient operation of the wheel it must be adjusted from time to time to correspond with the change in the rope.

I am aware that in the Willson Patent, No. 994,896, above referred to, it was proposed to provide an adjustment by means of a bolt. My construction differs materially from that shown in the said patent. By examining Fig. 1, it will be seen that I am enabled to reduce the circular curvature of the lines occupied by the cable around the wheel. The cable lies in straight lines across the peripheral gaps between each tooth and the next; and then, the deflection of the cable at the ends of the peripheral gaps is much less abrupt than if the cable, between the gaps, followed the arc of a circle struck from the axis. This results from the above described peripheral curvature for the toothed section which is on the arc of a circle struck with a radius considerably shorter than the radius from the axis.

After introducing this departure from the normal curvature, the necessity becomes still greater for having a strong holder for the tooth-carrying rim section and for having devices by which it can be accurately adjusted to bring the cable to proper position and for means to rigidly hold it in position after adjustment; the powerful pressure inward around a large part of the wheel being taken by each of the toothed rim sections in turn, with a tendency to force it inward.

What I claim is:

In a cable sprocket wheel, the combination of a hub section, a plurality of circumferentially elongated tooth-carrying sections having interlocking engagement with the hub section preventing relative circumferential movement and permitting relative movement inward and outward, said tooth-carrying sections being spaced apart circumferentially to form peripheral gaps to accommodate sprocket blocks on the cable and each having a cable engaging periphery on the line of curvature described by a radius shorter than the distance from said periphery to the wheel axis, means for adjusting the tooth-carrying sections outward and inward, and means for rigidly locking said sections in place after adjustment.

In testimony whereof, I affix my signature, in presence of two witnesses.

CHARLES M. SNIDER.

Witnesses:
DUDLEY T. FISHER,
W. E. MILLER.